United States Patent
Liu

(10) Patent No.: US 8,233,051 B2
(45) Date of Patent: Jul. 31, 2012

(54) METHOD FOR TESTING CAMERA FUNCTION OF ELECTRONIC DEVICE

(75) Inventor: Qing-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 451 days.

(21) Appl. No.: 12/552,687

(22) Filed: Sep. 2, 2009

(65) Prior Publication Data

US 2010/0302379 A1 Dec. 2, 2010

(30) Foreign Application Priority Data

May 26, 2009 (CN) .......................... 2009 1 0302644

(51) Int. Cl.
*H04N 7/18* (2006.01)
(52) U.S. Cl. ....................................................... 348/187
(58) Field of Classification Search .................. 348/187, 348/188, 175–176, 92–93; 356/72–73, 237.1, 356/239.2; 324/754–759; 382/141; 702/57, 702/81, 82, 116, 121, 123
See application file for complete search history.

(56) References Cited

U.S. PATENT DOCUMENTS

| | | | | |
|---|---|---|---|---|
| 4,575,124 A * | 3/1986 | Morrison | ...................... | 283/115 |
| 5,652,919 A * | 7/1997 | Itoh | ................................. | 396/55 |
| 6,546,116 B2 * | 4/2003 | Brunk et al. | .................. | 382/100 |
| 6,701,002 B1 * | 3/2004 | Karube | ......................... | 382/145 |
| 7,486,309 B2 * | 2/2009 | Knoedgen et al. | ............ | 348/187 |
| 7,525,593 B2 * | 4/2009 | Ichikawa et al. | .............. | 348/370 |
| 2004/0032496 A1 * | 2/2004 | Ebenstein et al. | ............ | 348/187 |
| 2005/0162517 A1 * | 7/2005 | Fujihara et al. | ............... | 348/187 |
| 2005/0219383 A1 * | 10/2005 | Ikeda | ........................ | 348/231.99 |
| 2011/0242329 A1 * | 10/2011 | Ikeda | ............................ | 348/175 |

* cited by examiner

*Primary Examiner* — Paulos Natnael
(74) *Attorney, Agent, or Firm* — Altis Law Group, Inc.

(57) ABSTRACT

A method is provided for testing a camera function of an electronic device. The electronic device communicates with a testing device. The method comprises the following steps. Parameters are configured by a parameter module of the electronic device. A camera of the electronic device takes pictures according to the configured parameters. The pictures and the configured parameters are sent to the testing device by a sending module of the electronic device. The pictures and the configured parameters are received by a receiving module of the testing device. Parameters of the pictures are got by a judging module of the testing device, and the judging module judges whether the parameters are identical to the configured parameters.

6 Claims, 3 Drawing Sheets

METHOD FOR TESTING CAMERA FUNCTION OF ELECTRONIC DEVICE

BACKGROUND

1. Technical Field

The present disclosure relates to methods for testing functions of an electronic device, and particularly to a method for testing a camera function of the electronic device.

2. Description of Related Art

Commonly, electronic devices of all kinds now include a camera. In order to ensure image quality, the camera function of the electronic device should be tested before the electronic device is sent to market. So, it is desired to provide a method to quickly test the camera function of the electronic device.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
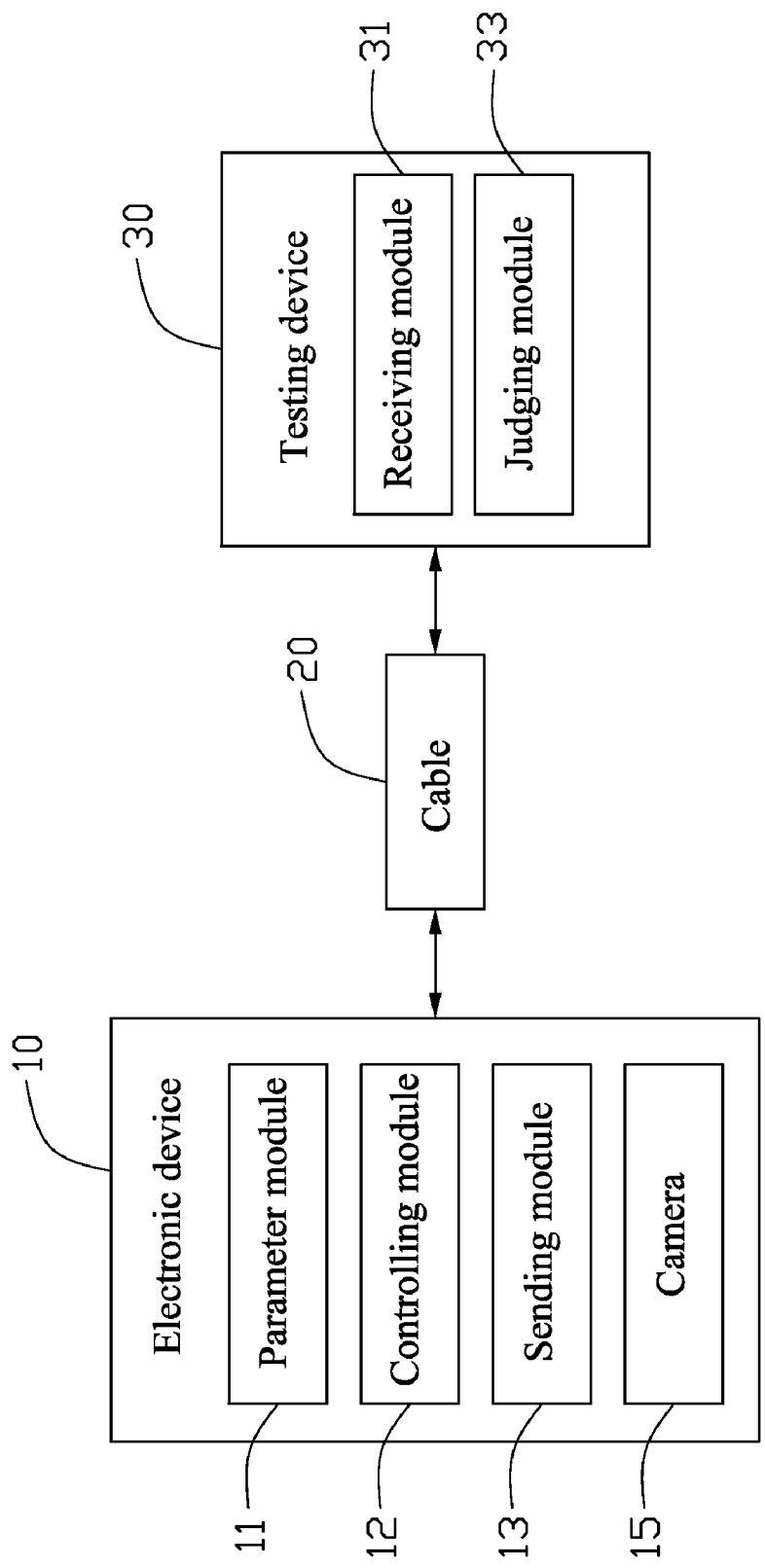
FIG. 1 is a block view of an electronic device, a cable, and a testing device, in accordance with an embodiment.

Referring to FIG. 1, an electronic device 10 in accordance with an embodiment is capable of communicating with a testing device 30 via a cable 20. The cable 20 may be a Universal Serial Bus (USB) cable, a network cable, or other cable.

The electronic device 10 may be, for example, a telephone, a personal digital assistant, or other device capable of taking pictures, and includes a camera 15, a parameter module 11, a controlling module 12, and a sending module 13. The camera 15 is capable of taking pictures. The parameter module 11 is capable of configuring parameters, and the camera 15 is capable of taking pictures according to the configured parameters. The configured parameters include resolution, number of pictures taken in each resolution, and so on. The controlling module 12 is capable of causing the camera 15 to take pictures according to the configured parameters, and judging whether the camera 15 has taken pictures in all the configured resolutions. The sending module 13 is capable of sending the pictures taken by the camera 15 and the configured parameters to the testing device 30.

The testing device 30 includes a receiving module 31 and a judging module 33. The receiving module 31 is capable of receiving the pictures and the configured parameters sent by the sending module 13. The judging module 33 is capable of getting parameters of the pictures, and judging whether parameters of the pictures are respectively identical to the configured parameters of the pictures.

Figure 2:
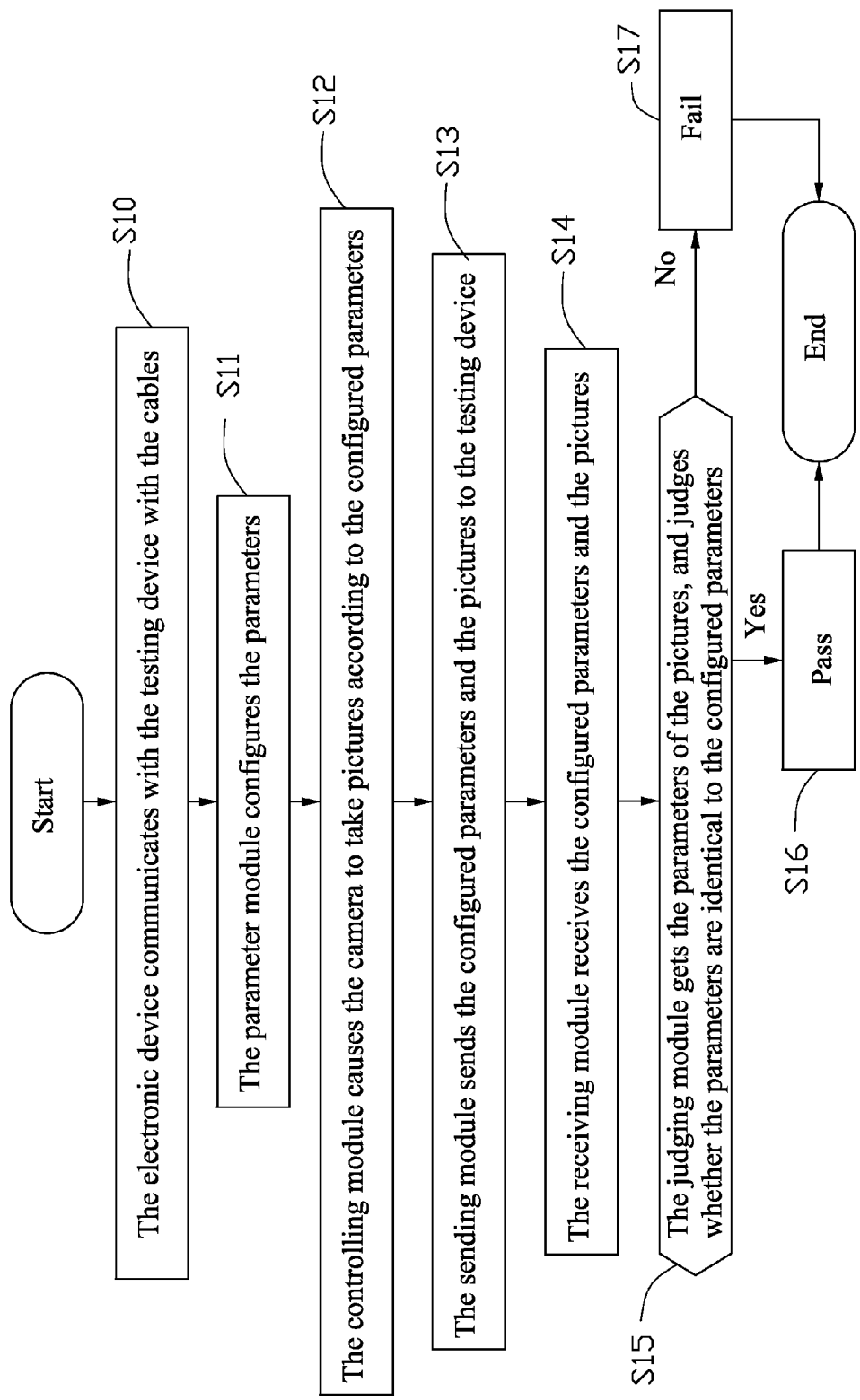
FIG. 2 is a flow chart of a method for testing a camera function of the electronic device of FIG. 1.

Referring also to FIG. 2, a method is provided to test the camera function of the electronic device 10 and includes following steps:

Step 10: the electronic device 10 communicates with the testing device 30 via the cable 20;

Step 11: the parameter module 11 configures the parameters;

Step 12: the controlling module 12 causes the camera 15 to take pictures according to the configured parameters;

Step 13: the sending module 13 sends the configured parameters and the pictures to the testing device 30;

Step 14: the receiving module 31 receives the configured parameters and the pictures;

Step 15: the judging module 33 gets the parameters of the pictures, and judges whether the parameters are identical to the configured parameters;

Step 16: if the parameters are identical to the configured parameters, a pass report is provided;

Step 17: if the parameters are different from the corresponding configured parameters, a fail report is provided.

Figure 3:
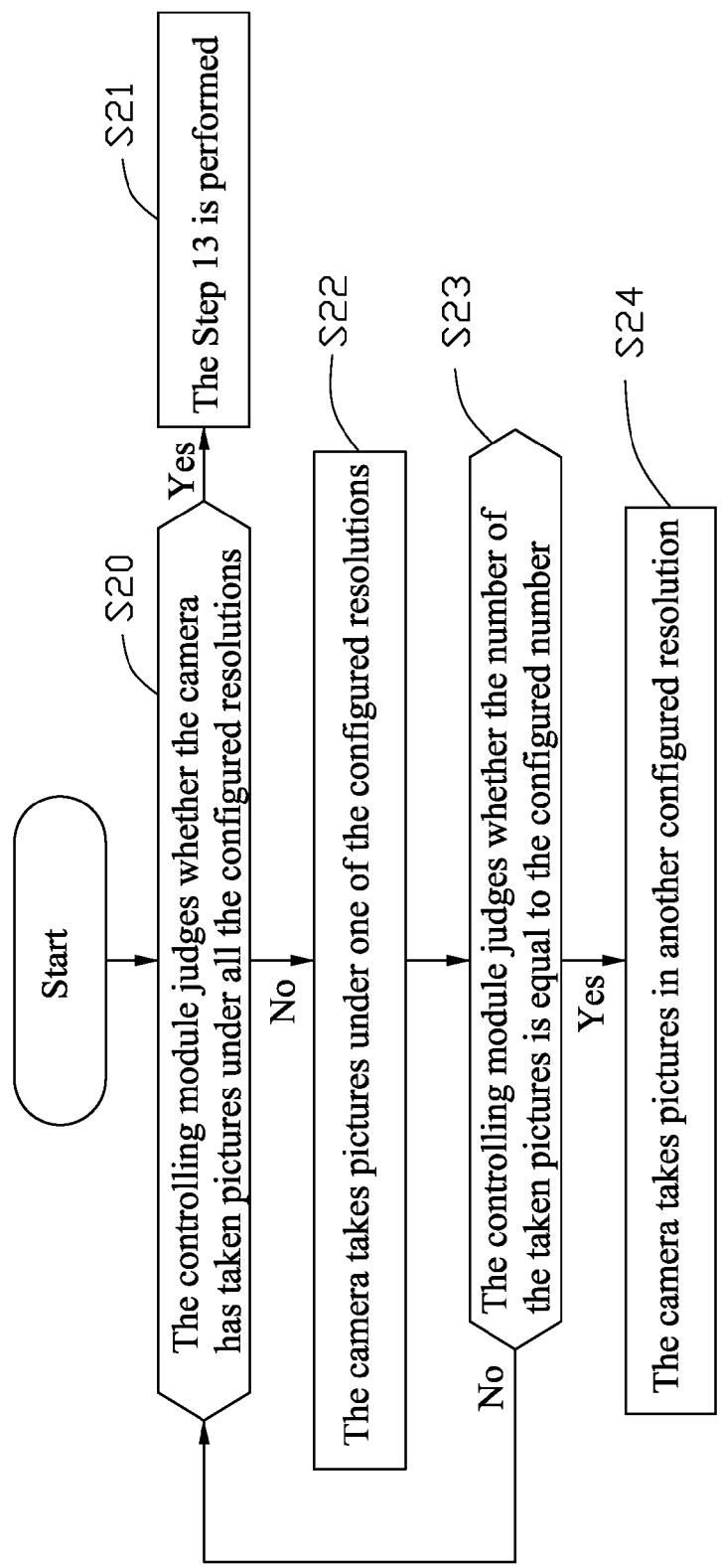
FIG. 3 is a flow chart of a camera of the electronic device of FIG. 1 taking pictures.

Referring also to FIG. 3, the step 11 includes following sub steps:

Sub step 20: the controlling module 12 judges whether the camera 15 has taken pictures using all the configured resolutions;

Sub step 21: if yes, the Step 13 is performed;

Sub step 22: if no, the camera 15 takes pictures using one of the configured resolutions;

Sub step 23: the controlling module 12 judges whether the number of the taken pictures is equal to the configured number;

Sub step 24: if yes, the camera 15 takes pictures using another configured resolution;

Sub step 25: if no, the sub step 20 is repeated.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A method for testing a camera function of an electronic device, the electronic device communicating with a testing device, the method comprising:

configuring parameters by a parameter module of the electronic device, and the parameters comprising a plurality of resolutions;

causing a camera of the electronic device to take pictures according to the configured parameters by a controlling module of the electronic device;

sending the pictures and the configured parameters to the testing device by a sending module of the electronic device;

receiving the pictures and the configured parameters by a receiving module of the testing device; and getting parameters of the pictures and judging whether the parameters are substantially identical to the configured parameters by a judging module of the testing device;

wherein the step of causing the camera to take pictures, comprises of the following substeps:

judging whether the camera has taken pictures in all the configured resolutions by the controlling module;

if yes, sending the pictures and the configured parameters to the testing device;

if no, taking pictures in one of the configured resolutions by the camera.

2. The method of claim 1, wherein the parameters further comprise a number of the pictures that the camera takes in each of the plurality of resolutions.

3. The method of claim 1, wherein the step of causing the camera to take pictures, further comprises of the following substeps:
   judging whether the number of the taken pictures is equal to the configured number by the controlling module;
   if yes, taking pictures in another configured resolution by the camera;
   if no, the step of judging whether the camera has taken pictures in all the configured resolutions is repeated.

4. A method for testing a camera function of an electronic device, the electronic device communicating with a testing device via a cable, the method comprising:
   configuring parameters by a parameter module of the electronic device, and the parameters comprising a plurality of resolutions;
   causing a camera of the electronic device to take pictures according to the configured parameters by a controlling module of the electronic device;
   sending the pictures and the configured parameters to the testing device by a sending module of the electronic device;
   receiving the pictures, getting parameters of the pictures and comparing the parameters with the configured parameters by the testing device;
   wherein the step of causing the camera to take pictures, comprises of the following substeps:
   judging whether the camera has taken pictures in all the configured resolutions by the controlling module;
   if yes, sending the pictures and the configured parameters to the testing device;
   if no, taking pictures in one of the configured resolutions by the camera.

5. The method of claim 4, wherein the parameters further comprise a number of the pictures that the camera takes in each of the plurality of resolutions.

6. The method of claim 4, wherein the step of causing the camera to take pictures, further comprises of the following substeps:
   judging whether the number of the taken pictures is equal to the configured number by the controlling module;
   if yes, taking pictures in another configured resolution by the camera;
   if no, the step of judging whether the camera has taken pictures in all the configured resolutions is repeated.

* * * * *